3,298,475
BRAKE MECHANISM

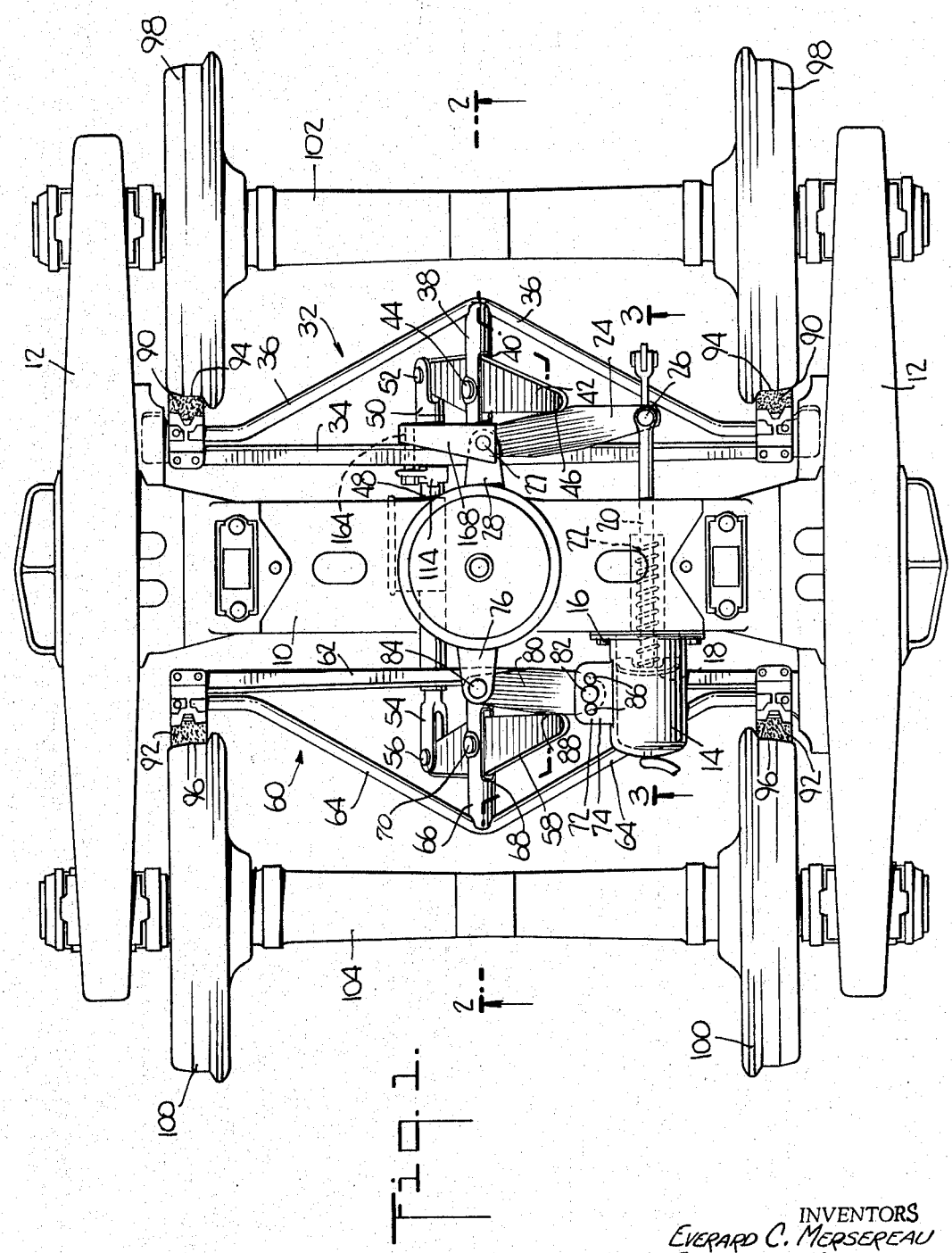

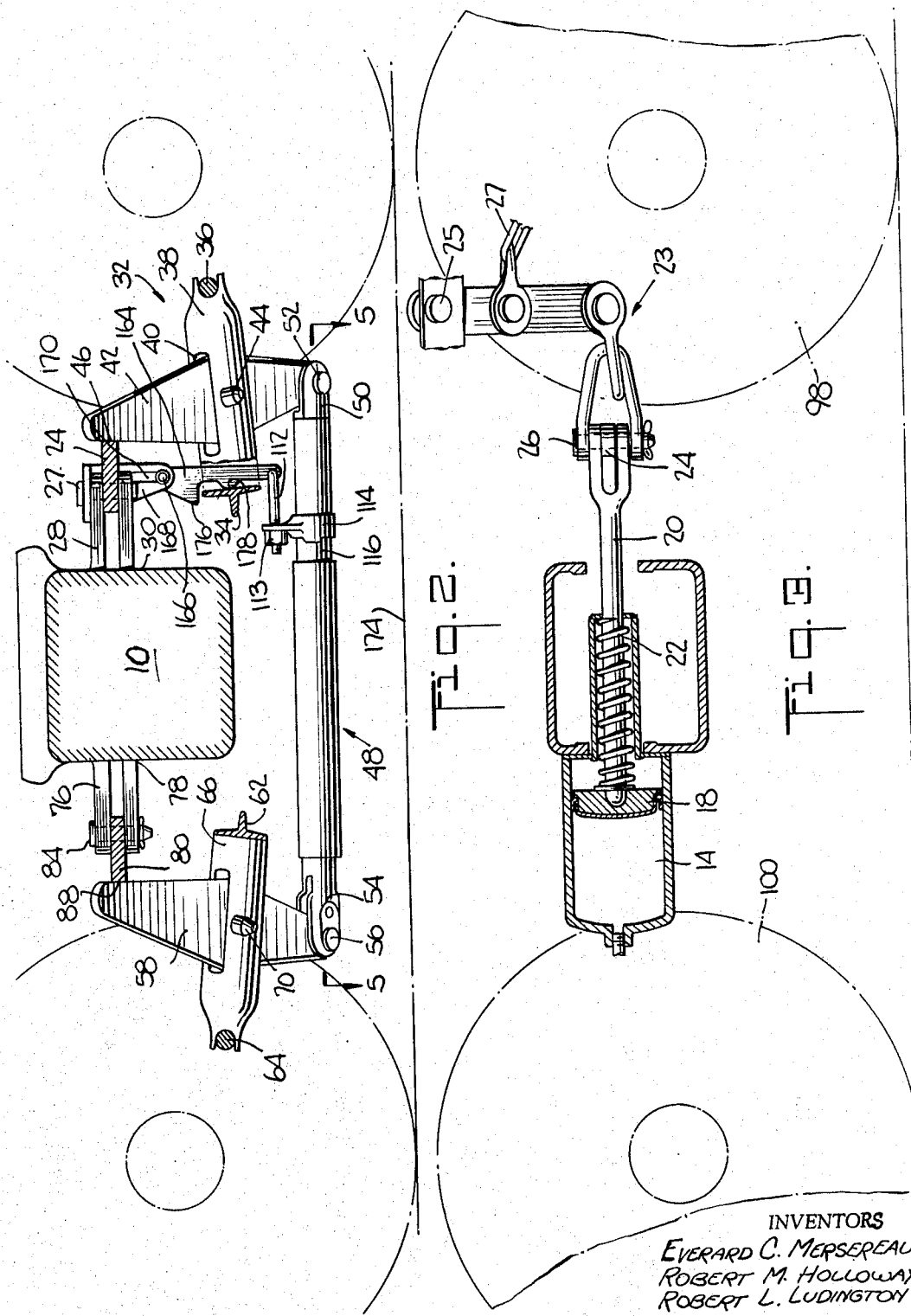

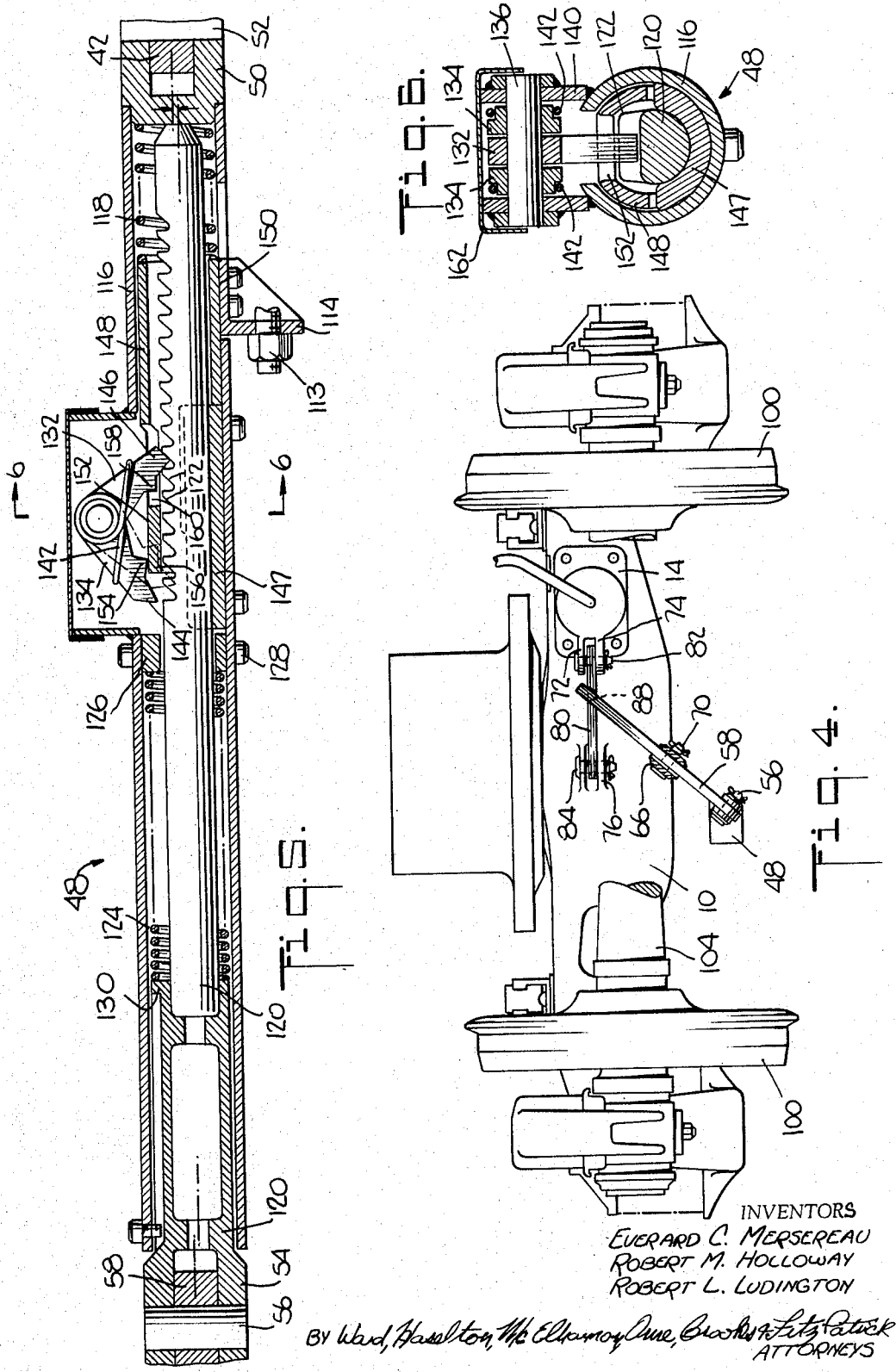

Everard C. Mersereau, Westfield, N.J., and Robert M. Holloway, 408 Springfield Ave., and Robert L. Ludington, Stop 34, Duneland Beach, both of Michigan City, Ind. 46360; said Mersereau assignor to said Holloway and said Ludington
Filed Sept. 22, 1964, Ser. No. 398,247
7 Claims. (Cl. 188—200)

This invention relates to brake mechanisms and, more particularly, to brake mechanism for frictionally engaging wheels of a railway car.

The present invention concerns improvements in brake mechanisms and slack adjusting means therefor described in the Mersereau Patent No. 3,001,612, and provides a number of advantages over this patent.

Brake mechanisms embodying the concepts of the present invention are particularly adapted among other possible uses for use on all standard railway car trucks as are now widely in use on American, Canadian and Mexican railroads.

Standard railway cars employ a truck mounted on each end of the car, each truck including two pair of wheels. Heretofore, the fluid cylinder and its related linkage was mounted on the underside of the car body between the two trucks. This entailed a large amount of supporting materials, safety hangers and rods of extended length which were necessary to reach from one end of the car to the other. An object of the present invention is to overcome the foregoing disadvantage encountered with prior art devices.

It is an object of the present invention to provide a new and improved brake adjusting mechanism which can be used conjointly with standard railway car truck brake parts, which eliminates the supporting material, safety hangers and connecting rods, and which simplifies the brake mechanism body or housing structure.

Another object of the invention is to provide a brake mechanism which increases the efficiency of the brake operation, which reduces the diameter of the automatic slack adjuster body, and which is reliable, compact, low in weight, convenient, practical and safe in operation.

Still another object of this invention is the provision of a new and improved brake mechanism which is relatively inexpensive to manufacture and reduces the labor maintenance costs therefor.

In present day high speed train operation, it is important that the piston travel of the air cylinder be maintained at a relatively close tolerance in order to properly balance the air pressure in the air cylinder with that in the reservoir. Otherwise a car with a long piston travel would be operating at a reduced pressure and at a time lag with respect to the other cars with proper piston travel; and likewise a car with short piston travel would be operating at a higher cylinder pressure and at an advance timing with respect to the cars with proper piston travel. Heretofore, this close tolerance has been maintained manually by some mechanical means, but this caused train delays and excessive man hours of labor to make the necessary adjustments. According to this invention means are provided for automatically maintaining pre-selected piston travel.

In essence, the present invention contemplates the provision of a brake mechanism for frictionally engaging wheels of a railway car which comprises a frame member, a fluid cylinder mounted on the frame member having a piston and piston rod actuated thereby. A first horizontal lever is provided having one end thereof pivotally mounted to the frame member and the other end thereof pivotally mounted on the piston rod. A brake beam is provided having brake shoes mounted at the opposite ends thereof which are brought into frictional engagement with the wheel tread of a pair of wheels carried by the railway truck. A truck live lever is centrally pivotally mounted on the brake beam. Slack adjusting means are provided having a first end and a second end. The truck live lever is adapted to slidably engage the first horizontal lever towards one end thereof and is further pivotally connected to the first end of the regulator means at the other end thereof. A vertical lever is pivotally mounted on the frame member and incorporates a rod protruding therefrom. The brake beam is adapted to engage the vertical lever and thereby cause movement of the rod member. Trigger means are mounted on the regulator means which trigger means are intended for actuating the regulator means in response to movement of the rod member.

A second brake beam is provided oppositely disposed and spaced from the first brake beam having brake shoes which are adapted to be selectively brought into frictional engagement with the wheel tread of a second pair of wheels mounted on the same truck of the railway car. A horizontal dead lever is fixedly mounted on the frame member. A truck dead lever is centrally pivotally mounted on the second brake beam and is pivotally connected at one end to the second end of the regulator means. The other end of the truck dead lever is adapted for slidable engagement with the horizontal dead lever, whereby the fluid piston and piston push rod movement is maintained at a preselected distance.

There has thus been outlined rather broadly the more important features of the invention in order that the detailed description thereof that follows may be bettter understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a plan view of a railway car truck having a brake mechanism constructed in accordance with the concepts of this invention;

FIG. 2 is a sectional view taken along the line 2—2 of FIG. 1 and showing the means for actuating the slack adjuster regulator;

FIG. 3 is a sectional view taken along the line 3—3 of FIG. 1 showing the air cylinder, piston and piston rod mechanisms;

FIG. 4 is an end elevation of the railway car truck of FIG. 1;

FIG. 5 is a sectional view taken along the line 5—5 of FIG. 2 showing details of the slack adjuster regulating means; and

FIG. 6 is a sectional view taken along the line 6—6 of FIG. 5.

In the illustrated embodiment of the invention, the railway car truck may be of any conventional type such as one having a frame 10 (FIG. 1) and side frames 12. An air cylinder 14 is mounted on the frame 10 as by means of bolts 16. The air cylinder 14 (FIG. 3) is adapted to receive a piston 18 having a piston push rod 20, a coil spring 22 being surmounted about the push rod 20 for purposes of returning the piston 18 to the bottom of its stroke. Hand brake means are provided to actuate the piston 18 including a linkage designated generally at 23 which is pivotally connected to the piston rod 20 as by means of a pin 26, which is pivotally mounted as at 25 and which is actuated by a chain 27.

As best seen in FIG. 1, a first horizontal lever 24 is pivotally mounted to the push rod 20 as by means of pin 26 and is pivotally mounted at the other end thereof by means of pin 27 to a support member 28 which support member is fixedly connected to the frame 10 as at 30 (FIG. 2). Still referring to FIG. 1, a brake beam or brake beam frame designated generally at 32 includes a brake beam cross member 34, a pair of arms 36 and a medial strut 38. The strut 38 is provided with an elongated slot 40 through which a truck live lever 42 passes, the truck live lever 42 being pivotally connected to the strut at point 44. The first horizontal lever 24 is adapted to contact and push against the truck live lever 42 at point 46 (FIG. 1). The other end of the truck live lever 42 is pivotally connected to an automatic slack adjuster 48 which has a first end in the form of a yoke member 50 carrying a pin 52 (FIGS. 1 and 2).

Still referring to FIG. 1, the other end of the automatic slack adjuster 48 is provided with a yoke member 54 which is connected by means of pin 56 to a truck dead lever 58. A second brake beam designated generally at 60 includes a second brake beam cross member 62, a pair of arms 64 and a strut 66 having an elongated slot 68. The truck dead lever 58 passes through the slot 68 and is pivotally connected by means of pin 70 to the strut 66 of the brake beam 60. A support member 72 (FIGS. 1 and 4) is fixedly attached to the side of the air cylinder 14 as at 74 and a second support member 76 is fixedly attached to the frame 10 as at 78 (FIG. 2). A horizontal dead lever 80 is connected at one end to the support member 72 as at 82 and the other end thereof is connected to the support member 76 as at 84. It is noted that support member 72 is provided with a series of holes 86 (FIG. 1) for adjusting the location of horizontal dead lever 80 to suit truck structure variations. The truck dead lever 58 is adapted to contact the horizontal dead lever 80 at point 88.

The outer portions of the brake beam 32 and 60 are provided with brake shoes 90 and 92 respectively, which bear against the wheel tread 94 and 96 of the wheels 98 and 100 respectively, the pair of wheels 98 being interconnected by shaft 102 and the pair of wheels 100 being interconnected by means of shaft 104.

In operation the force exerted by an application of fluid to the fluid cylinder 14 reacts against the piston 18 and is transmitted through the aforementioned linkage, thereby forcing the shoes 90 and 92 of the brake beams 32 and 60 against the wheel treads 94 and 96, respectively.

As best seen in FIG. 2, the actuation of the automatic slack adjuster is accomplished by means of a vertical lever 164 pivotally mounted as by pivot pin 166 to a supplementary bracket 168 permanently affixed to bracket 28. The bracket 168 is provided with a slot 170 to permit the spring supported frame 10 to deflect vertically when a vertical load is imposed thereon without changing the relative positions of the pivot pin 166, the vertical center line of the frame 10 and the horizontal centerline of the slack adjuster 48 one with respect to the others.

The brake beam member 34, having a fixed position with respect to the rail 174, supports the lever 164 by means of a projection 176 and thereby maintains a vertical relationship between the slack adjuster 48 and the pivot pin 166. Lever 164 is also provided with a projection 178 (FIG. 2) for maintaining a horizontal relationship between the lever 164 and the slack adjuster 48. A rod 112 is pivotally connected to the lever 164. The movement of the member 34 is transmitted to the lever 164, to rod 112, which is slidably mounted within an activating arm or trigger 114 and held by a nut 113, the trigger 114 being slidably mounted on a portion of the housing 116 and held against movement by means of coil spring 118 (FIG. 5).

Referring to FIG. 5 the automatic slack adjuster comprises the housing 116, a rack bar 120 having rack teeth 122 thereon at one side thereof, the rack being movably mounted with the teeth in the housing 116. A coil spring 124 in the housing 116 acts between a stop 126 fixedly connected to the housing by means of screws 128 and a collar 130 on the rack 120 for urging the teeth 122 to the left as viewed in FIG. 5. A locking pawl 132 and a load pawl 134 are rotatably mounted on shaft 136 (FIG. 6) with pawl 132 acting as a spacer therebetween, shaft 136 being fixedly mounted on a projecting portion 140 of the housing 116. The pawls 132 and 134 are urged toward the rack teeth 122 by spring 142 (FIGS. 5 and 6). As best seen in FIG. 5, the load pawl 134 has a portion 144 which is engageable with the rack teeth 122 and the locking pawl 132 has a portion 146 which is engageable with the opposite side of the rack teeth 122. It will be noted that the loading pawl 134 prevents movement of the rack 120 to the right as viewed in FIG. 5 and the locking pawl 132 prevents movement of the rack 120 to the left as viewed in FIG. 5.

Bearing 147 (FIGS. 5 and 6) supports the rack 120 for longitudinal movement thereof. An actuator 148 is contained within the housing 116 and is fixedly connected to the activating arm or trigger 114 as at 150 (FIG. 5). The actuator 148 also rides on the bearing member 147. For purposes of engaging the pawls 132 and 134, the actuator 148 is provided with an upper surface 152 (FIG. 5).

The load pawl 134 is provided with a projecting portion 154 which is engageable with a portion 156 of the actuator 148. The locking pawl 132 is provided with a projecting portion 158 which is engageable with portion 160 of the actuator 148. When the actuator 148 is moved axially of the housing 116, to the left as viewed in FIG. 5, the projection 154 is raised and rides on the upper surface 152 of the actuator 148 and when the actuator 148 is moved to the right as viewed in FIG. 5, the projection 158 is raised and rides on the upper surface 152 of the actuator 148. In order to keep the pawl mechanisms free from dirt a cover 162 (FIG. 6) is provided for the purpose.

In operation when the brakes are released, that is, when the piston rod 20 (FIG. 1) is in its retracted position, levers 24 and 42 move to such positions wherein the brake beam 32 is in its retracted or disengaged position. The slack adjuster 48 acts as a rigid elongated bar so that lever 58 using point 88 as a fulcrum retracts or disengages the brake beam 60 from the wheels 100. The spring 118 urges the actuator 148 to the left as viewed in FIG. 5. Hence, the load pawl 134 is disengaged and the projection 146 of the locking pawl 132 engages the teeth 122 of the rack 120, as shown by the solid lines in FIG. 5.

As fluid under pressure is supplied to the fluid cylinder 14 (FIG. 1) piston rod 20 is extended and the levers 24 and 42 move to positions such that the brake beam 32 is extended so that the brake shoes 90 move to the wheel treads 94, and through the motion of the slack adjuster 48, which is acting like a rod at this time, the lever 58 fulcrums at point 88 to move the brake beam 60 outwardly so that the brake shoes 92 are urged towards the wheel treads 96. As seen in FIG. 2, outward movement of the brake beam cross member 34 of the brake beam 32 causes member 34 to engage projection 178 on the vertical lever 164 and hence moves rod 112 to the right as viewed in FIG. 2 and thereby moves the trigger 114 to the right as viewed in FIG. 2. Movement of the trigger 114 to the right moves the actuator 148 to the right as viewed in FIG. 5, and hence the portion 160 of the actuator 148 engages the portion 158 of the locking pawl 132 and thereby rotates the portion 158 of the locking pawl 132 out of engagement with the teeth 122 of the rack 120.

At an intermediate stage in the application of the brake, the actuator 148 (FIG. 5) will be in such a position that both of the pawls 132 and 134 will be raised and supported by the upper surface 152 of the actuator 148, and hence the pawls will be out of engagement with the rack teeth 122. At this time, namely when all of the pawls are disengaged from the rack teeth 122, if there is slack in the brake riggings, the rack bar 120 will move to the left (as seen in FIG. 5) with respect to the housing 116 under the force of the spring 124, thereby lengthening the slack adjuster and taking up the slack in the rigging. It will be appreciated that the spring 124 applies sufficient force to the collar 130 on the rack bar 120 to take up any slack in the brake rigging when the locking pawl is disengaged. However, the spring 124 is not strong enough to cause the brake shoes 90 and 92 (FIG. 1) to exert any appreciable pressure on the wheels 98 and 100 of the railway car when the pawls are disengaged from the teeth 122. The spring 118 is merely strong enough to return the actuator 148 to its position as shown in FIG. 5.

When the brakes are further applied by adding fluid to the fluid cylinder 14 (FIG. 1), the levers 24 and 42 move to a position such that the brake beam 32 moves still further outwardly or to the right as viewed in FIG. 1. As seen in FIG. 2 movement of the brake beam 32 to the right, moves the rod 112 to the right and hence the trigger 114 to the right. As seen in FIG. 5, movement of the trigger 114 to the right compresses the spring 118, moves the actuator 148 to the right and hence the portion 154 of the loading pawl 134 disengages the upper surface 152 of the actuator 148. Due to the force of spring 142 the pawl 134 pivots downwarly and the portion 144 thereof engages the rack teeth 122 of the rack 120. Thence, the braking force is transmitted through the housing 116, the load pawl 134 and the rack bar 120. Thus, there is a rigid connection between the truck live lever 42 (FIG. 1) and the truck dead lever 58 and the full brake applying force is transmitted through the automatic slack adjusted 48.

When the brakes are released the cycle of operations described above is repeated in reverse order so that the parts return to their original positions.

In the event that the overall length of the slack adjuster 48 must decrease, for example, because of the replacement of worn brake shoes by new brake shoes, upon actuation of the fluid cylinder, the rack 120 (FIG. 5) will move to the right with respect to the housing 116. The load pawl 134 is disengaged from the teeth 122 of the rack bar 120 and the locking pawl 132 rides or slips over the teeth 122 as the rack bar 120 moves to the right until the slack adjuster reaches its corresponding length. Thence, the baking force is transmitted through the housing 116, the load pawl 134 and the rack bar 120 in the manner aforesaid.

Attention is directed to the fact that the slack adjuster 48 is in effect a double acting device and serves to maintain the piston rod travel at a preselected amount automatically, and hence the braking force is uniformly applied in each car of a series of cars. Thus, the possibility of some cars being held back while other cars roll ahead is substantially eliminated.

It is noted that first horizontal lever 24, horizontal dead lever 80 and vertical lever 164 have been designated as horizontal and vertical levers respectively as a matter of convenience. However, these levers can have other relative positions as long as they perform their described functions.

It is seen that we have contributed a new and improved brake mechanism which is ideally suited for installation upon standard railway cars.

Although a particular embodiment of the invention is herein disclosed for purposes of explanation, further modifications thereof after study of this specification, will be apparent to those skilled in the art to which the invention pertains. Reference should accordingly be had to the appended claims in determining the scope of the invention.

What is claimed and described to be secured by Letters Patent is:

1. A brake mechanism for a railway car having a truck carrying a pair of wheels, said mechanism comprising a frame member, a fluid cylinder mounted on said frame member, a piston and piston rod actuated by said fluid cylinder, a first lever having one end pivotally mounted on said frame member and the other end thereof pivotally mounted on said piston rod, a brake beam having portions which are selectively brought into frictional engagement with said pair of wheels, a truck lever pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck lever slidably engaging said first lever and being directly pivotally connected to the slack adjusting means, and means responsive to movement of said brake beam for actuating said slack adjusting means.

2. A brake mechanism for a railway car having a truck carrying a first and a second pair of wheels, said mechanism comprising a frame member, a fluid cylinder mounted on said frame member, a first brake beam having portions which are selectively brought into frictional engagement with said pair of wheels, a second brake beam having portions which are selectively brought into frictional engagement with said second pair of wheels, means operatively interconnecting said fluid cylinder with said first brake beam, slack adjusting means operatively connecting said first brake beam with said second brake beam, said slack adjusting means being extensible and retractable for eliminating the slack and controlling the travel of the brake mechanism, said slack adjusting means being lockable in a rigid condition when transmitting the full braking force between said brake beams, a lever pivotally mounted on said frame member, a rod operatively connected to said lever, said first brake beam being adapted to engage said lever and thereby cause movement of the rod, and trigger means mounted on the slack adjusting means for actuating said slack adjusting means in response to movement of said rod.

3. A brake mechanism for frictionally engaging wheels of a railway car comprising a frame member, a fluid cylinder mounted on said frame member, a piston and piston rod actuated by said fluid cylinder, a first horizontal lever having one end pivotally mounted on said frame member and the other end thereof pivotally mounted on said piston rod, a brake beam having portions which are selectively brought into frictional engagement with said wheels, a truck live lever being centrally pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck live lever slidably engaging said first horizontal lever towards one end thereof, and being pivotally connected to one end of the slack adjusting means at the other end thereof, a second lever pivotally mounted on said frame member, means protruding from said second lever, said brake beam being adapted to engage said second lever and thereby cause movement of the means protruding from said second lever, trigger means mounted on the slack adjusting means for actuating said slack adjusting means in response to movement of said means protruding from said second lever, whereby the fluid piston and piston push rod movement is maintained at a preselected distance.

4. A brake mechanism for a railway car having a truck carrying a first and a second pair of wheels, said mechanism comprising a frame member, a fluid cylinder mounted on said frame member, a piston and piston rod actuated by said fluid cylinder, a first horizontal lever having one end pivotally mounted on said frame member and the other end thereof pivotally mounted on said piston rod, a first brake beam having portions which are selectively brought into frictional engagement with said first pair of wheels, a truck live lever being centrally pivotally mounted on said brake beam, slack adjusting means having a first end and a second end, one end of said truck live lever slidably engaging said first horizontal lever and the other end of the truck live lever being pivotally connected to the first end of the slack adjusting means, trigger means mounted on the slack adjusting means for actuating said slack adjusting means in response to movement of said brake beam, a second brake beam having portions which are selectively brought into frictional engagement with said second pair of wheels, a truck dead lever centrally pivotally mounted on said brake beam, said truck dead lever having one end thereof pivotally connected to the second end of said slack adjusting means, said slack adjusting means being extensible and retractable for eliminating the slack and controlling the travel of the brake mechanism, said slack adjusting means being lockable in a rigid condition when transmitting the full braking force between said brake beams, a horizontal dead lever fixedly attached to said frame member, and said truck dead lever having the other end thereof slidably engaging said horizontal dead lever at a preselected point for pivoting said truck dead lever to actuate said second brake beam.

5. A brake mechanism for a railway car having a truck which carries a first and a second pair of wheels, said mechanism comprising a frame member, a fluid cylinder mounted on said frame member, a piston and piston rod actuated by said fluid cylinder, a first brake beam having brake shoes which are selectively brought into engagement against the wheel tread of said first pair of wheels, a second brake beam having brake shoes which are selectively brought into frictional engagement with the wheel tread of said second pair of wheels, lever means connecting said piston rod with said first brake beam, slack adjusting means having a first end and a second end, said slack adjusting means being extensible and retractable for eliminating the slack and controlling the travel of the brake mechanism, said slack adjusting means being lockable in a rigid condition when transmitting the full braking force between said brake beams, means interconnecting said first end and said lever means, means interconnecting said second end and said second brake beam, second lever means mounted on said frame member and engageable with said first brake beam for movement in response to movement of said first brake beam, said slack adjusting means comprising a housing, trigger means mounted thereon for actuation of said slack adjusting means in response to movement of said second lever means, a rack bar having rack teeth being movably mounted on said housing, spring means acting between said housing and said rack bar for urging said bar in a predetermined direction; a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; and actuator movably mounted on said member and engageable with said pawls, said actuator, in a first position thereof, engaging and holding said load pawl out of engagement with said teeth and permitting said locking pawl to engage said teeth, and said actuator, in a second position thereof, engaging and holding said locking pawl out of engagement with said teeth and permitting said load pawl to engage said teeth.

6. A brake mechanism for a railway car according to claim 5 wherein said first brake beam comprises a brake beam cross member, a pair of arms having the ends thereof connected to the ends of said cross member respectively, a strut interconnecting the medial portion of said cross member with the other ends of said arms respectively, the ends of said cross member carrying said brake shoes respectively; and wherein said second lever means is a vertical lever pivotally mounted on said frame member, said vertical lever having a first projection thereon and a second projection thereon, said brake beam cross member being adapted to engage said first projection for purposes of supporting said vertical lever, and said brake beam cross member being adapted to engage said second projection for causing movement of said vertical lever in response to movement of said brake beam.

7. A brake mechanism for a railway car having a truck carrying a first pair of wheels and a second pair of wheels, said mechanism comprising a frame member, a fluid cylinder mounted on said frame member, a piston and piston rod actuated by said fluid cylinder, a first horizontal lever having one end pivotally mounted on said frame member and the other end pivotally mounted on said piston rod, a first brake beam having a brake beam cross member, a pair of arms having the ends thereof connected to the ends of said cross member respectively, a strut interconnecting the medial portion of said cross member with the other ends of said arms respectively, brake shoes carried by the ends of said cross member for selectively being brought into engagement with the wheel tread of said first pair of wheels, a truck live lever being pivotally mounted on said strut, slack adjusting means having a first end and a second end, one end of said truck live lever slidably engages said first horizontal lever and the other end of the truck live lever being pivotally connected to the first end of the slack adjusting means, a second brake beam having brake shoes which are selectively brought into frictional engagement with the wheel tread of said second pair of wheels, said second brake beam comprises a brake beam cross member, a pair of arms having the ends thereof connected to the ends of said cross member respectively, a strut interconnecting the medial portion of said cross member with the other ends of said arms respectively, the ends of said cross member carrying said brake shoes respectively; a horizontal dead lever adjustably mounted on said frame, a truck dead lever pivotally mounted on the strut of said second brake beam, one end of said truck dead lever being pivotally connected to the second end of said slack adjusting means and the other end of said truck dead lever engaging said horizontal dead lever at a fulcrum point for pivoting said truck dead lever to actuate said second brake beam, a vertical lever pivotally mounted on said frame member, said vertical member having a first projection thereon and a second projection thereon, said first brake beam cross member being adapted to engage said first projection for purposes of supporting said vertical lever and said first brake beam cross member being adapted to engage said second projection for causing movement of said vertical lever in response to movement of said brake beam, a rod operatively connected to said vertical lever, said slack adjusting means comprising a housing, trigger means mounted thereon for actuating said slack adjusting means in response to movement of said rod, a rack bar having rack teeth being movably mounted on said housing, spring means acting between said housing and said rack bar for urging said bar in a predetermined direction; a locking pawl and a load pawl mounted on said housing adjacent said teeth and engageable respectively with opposite sides of said teeth for respectively preventing movement of said bar in said direction and in an opposite direction; means engaging said pawls for moving said pawls into engagement with said teeth; an actuator movably mounted on said member and engageable with said pawls, said actuator, in a first position thereof, engaging and holding said load pawl out of engagement with said teeth and permitting said locking pawl to engage said teeth, and said actuator, in a second position thereof, engaging and holding said locking pawl out of engagement with said teeth and permitting said load pawl to engage said teeth, said slack adjusting means being extensible and retractable for eliminating the slack and controlling the travel of the brake mechanism, and said slack adjusting means being lockable in a rigid condition when transmitting the full braking force between said brake beams.

References Cited by the Examiner

UNITED STATES PATENTS

| | | | |
|---|---|---|---|
| 3,001,612 | 9/1961 | Mersereau | 188—196 |
| 3,177,984 | 4/1965 | Taylor | 188—197 |
| 3,226,601 | 8/1966 | Taylor | 188—52 |

DUANE A. REGER, *Primary Examiner.*